W. M. BARTRAM.
STEERING MECHANISM.
APPLICATION FILED MAR. 21, 1911.
1,012,233.
Patented Dec. 19, 1911.
2 SHEETS—SHEET 1.
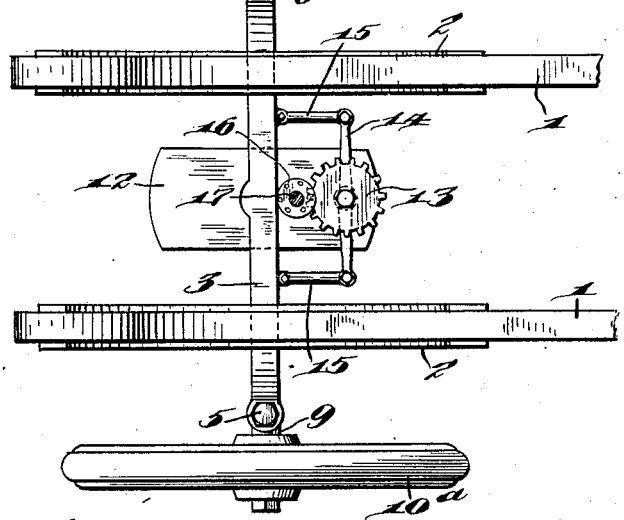
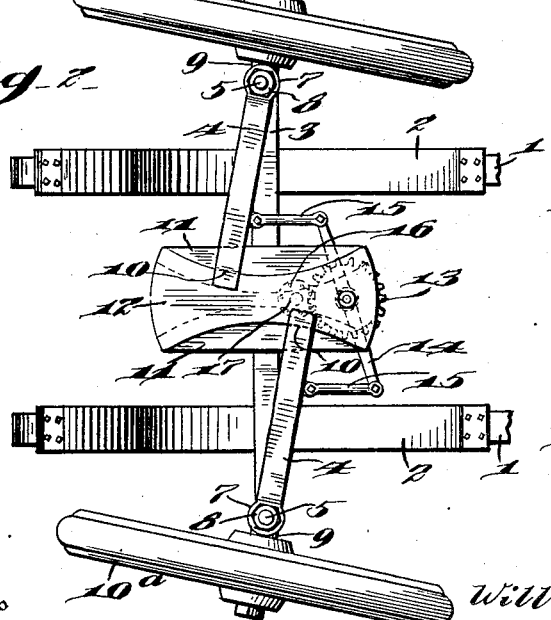
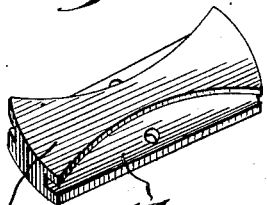
Inventor
William M. Bartram,
By Joshua R. H. Potts,
Attorney
Witnesses W. M. BARTRAM.
STEERING MECHANISM.
APPLICATION FILED MAR. 21, 1911.
1,012,233.
Patented Dec. 19, 1911.
2 SHEETS—SHEET 2.
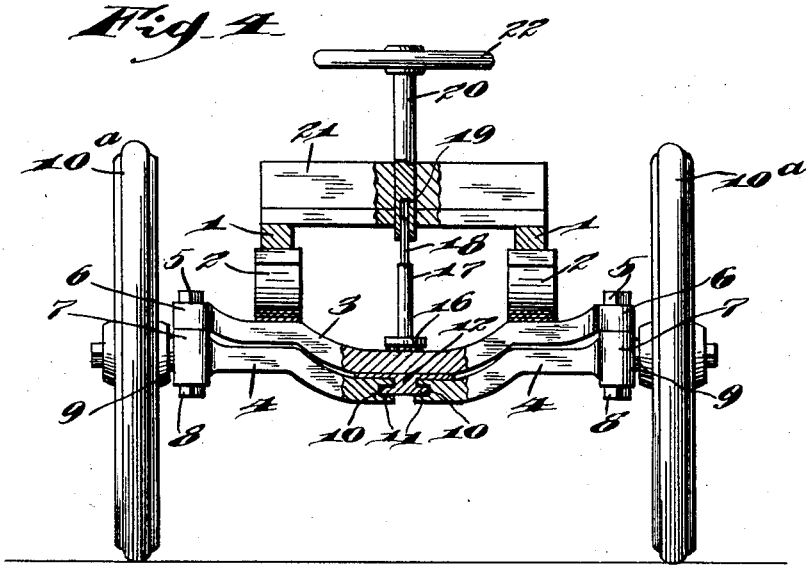
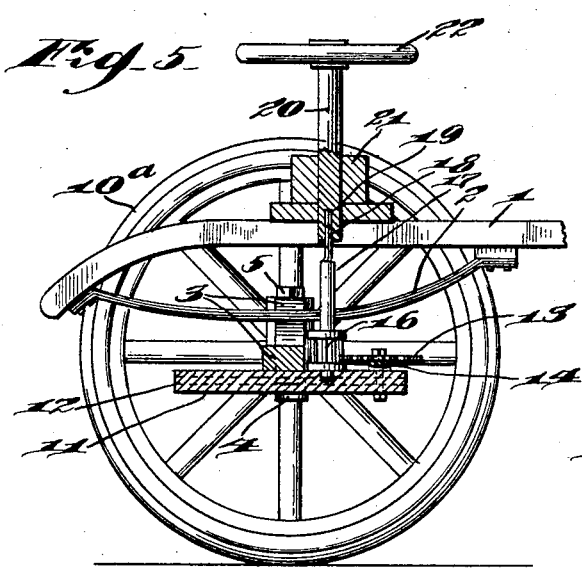
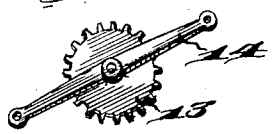
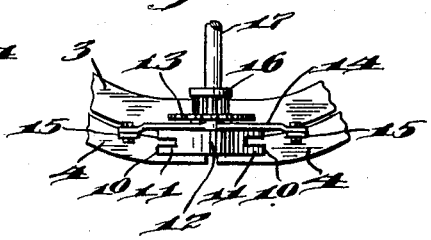

UNITED STATES PATENT OFFICE.

WILLIAM M. BARTRAM, OF PHILADELPHIA, PENNSYLVANIA.

STEERING MECHANISM.

1,012,233.  Specification of Letters Patent.  Patented Dec. 19, 1911.

Application filed March 21, 1911. Serial No. 615,942.

*To all whom it may concern:*

Be it known that I, WILLIAM M. BARTRAM, a citizen of the United States, residing at Philadelphia, in the county of Philadelphia and State of Pennsylvania, have invented certain new and useful Improvements in Steering Mechanism, of which the following is a specification.

My invention relates to improvements in steering mechanism, the object of the invention being to provide improvements of this character which are especially adapted for use in connection with motor vehicles, and which embodies in its construction simplicity, strength, durability, quick control, neatness, and efficiency.

A further object is to provide improved means for supporting the inner ends of pivoted axle sections, improved means for moving said axle sections to steer the vehicle.

With these and other objects in view, the invention consists in certain novel features of construction and combinations and arrangements of parts, as will be more fully hereinafter described and pointed out in the claim.

In the accompanying drawings: Figure 1, is a sectional plan view illustrating my improvements. Fig. 2, is a bottom plan view of Fig. 1. Fig. 3, is a perspective view of the block 12. Fig. 4, is a view in cross section showing parts in elevation and parts in section for purposes of clearness. Fig. 5, is a view in longitudinal section through the center of the mechanism, and Figs. 6 and 7 are views illustrating details of construction.

1, 1, represent the longitudinal bars of a running gear, which are supported by springs 2 on a transverse axle 3. At the ends of this axle 3, axle sections 4 are pivotally supported on bolts 5, which are mounted in alined bearings 6 and 7 in axle 3, and pivoted sections 4 respectively, said bolts being secured in place by nuts 8. These axle sections 4 are provided with journals 9, which are mounted in wheels 10ª. The inner ends of axle sections 4 are provided with grooves 10 to engage the edges of a plate 11, the opposite sides of which are curved in arcs of circles concentric with the pivotal points of said sections 4, so that said sections in any position of their adjustment, will have their inner ends in engagement with the edges of plate 11, hence supporting and strengthening the inner ends of said sections. This plate 11 is preferably integral with a block 12, and said block is secured to the under face of axle 3 at the center of the latter. On block 12, a gear 13 is mounted to turn in horizontal position, and to this gear a lever 14 is fixed, said lever projecting at both ends beyond the gear. The ends of this lever 14 are pivotally connected by links 15 with sections 4, so that the turning of said gear transmits pivotal movement to the axle sections.

A pinion 16 is secured to a vertical shaft 17, supported on block 12, and meshes with gear 13, and the upper end of this shaft 17 is made angular as shown at 18 to enter an angular socket 19 in a steering shaft 20. This steering shaft 20 is supported in any suitable framework 21, and has a steering wheel 22 at its upper end. It will be noted that the socket 19 is elongated, so that the frame 21 may move vertically with relation to the shaft 17, and still permit an interlocking connection between the steering shaft 20 and shaft 17. When steering shaft 20 and shaft 17 are turned by means of the steering wheel 22, pinion 16 will transmit a rotary motion to gear 13, and lever 14, through the medium of links 15, will impart a pivotal movement to the pivotal axle sections 4 as shown most clearly in Fig. 2.

By reason of the shape of plate 11 and the engagement of the grooved ends 10 therewith, the inner ends of sections 4 are firmly held in any position to which they may be moved, and the structure therefore is strong and substantial to withstand the necessary strains and stresses to which such a mechanism is necessarily put.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with an axle, of axle sections pivotally connected between their ends to the outer ends of said axle, journals on the outer ends of said pivoted axle sections to enter the hubs of supporting wheels, a stationary plate having its opposite edges curved concentrically with the pivots of said pivoted axle sections, said pivoted axle sections engaging the curved edges of said plate, a block fixed to said plate, a gear on said block, a lever secured to said gear, links pivotally connecting the ends of said lever with said pivoted axle sections, a pinion mounted on said block and meshing with said gear, and a steering shaft connected to said pinion, substantially as described.

In testimony whereof I have signed my name to this specification in the presence of two subscribing witnesses.

WILLIAM M. BARTRAM.

Witnesses:
R. H. KRENKEL,
CHARLES E. POTTS.

Copies of this patent may be obtained for five cents each, by addressing the "Commissioner of Patents. Washington, D. C."